March 19, 1957  N. L. MILLER  2,785,569
WIND TUNNEL FORCE AND MOMENT MEASURING DEVICE
Filed May 24, 1949
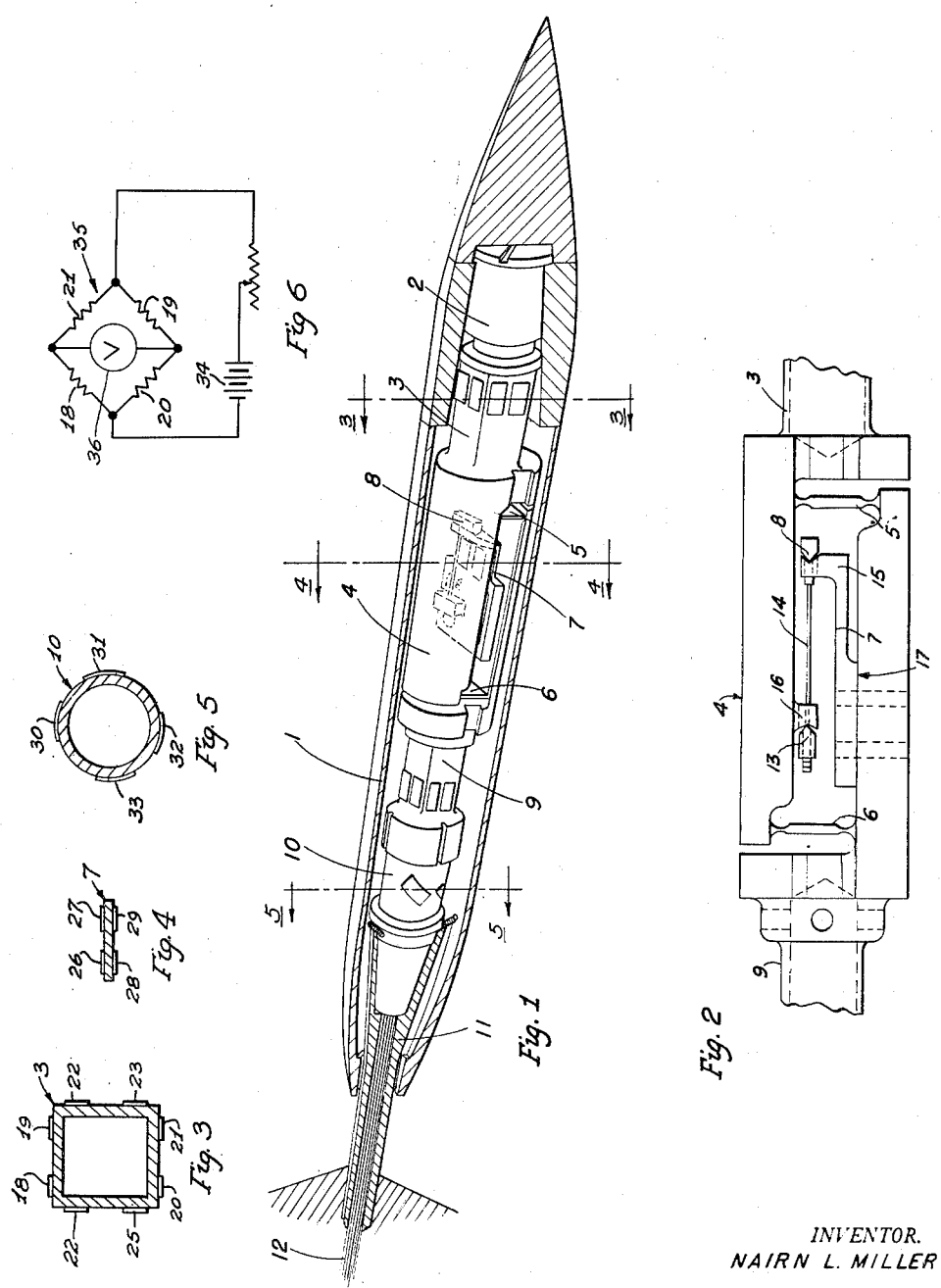
INVENTOR.
NAIRN L. MILLER
BY
ATTORNEY

# United States Patent Office 2,785,569
Patented Mar. 19, 1957

2,785,569
WIND TUNNEL FORCE AND MOMENT MEASURING DEVICE

Nairn L. Miller, Orangeburg, N. Y., assignor to North American Aviation, Inc.

Application May 24, 1949, Serial No. 95,048

5 Claims. (Cl. 73—147)

This invention pertains to the measurement of forces on wind tunnel models. It pertains particularly to the measurement of pitching, yawing, and rolling moments, and drag, lift, and side forces on an aircraft model being tested in a wind tunnel. In the past a major difficulty in the testing of wind tunnel scale models has been the diminutive size of the moments and forces acting on the model. Great precision is required in the measurement of these forces because of the scale at which the tests are conducted. The present invention provides means for measuring these forces with great accuracy. It also eliminates to a large degree the aerodynamic effects of force and moment carrying structures necessary in conventional wind tunnel balances. In the past the forces and moments applied to the wind tunnel model had to be transmitted to an external point where they were measured. Aerodynamic corrections made necessary by the presence of this structure in the wind tunnel in the vicinity of the model were therefore inescapable.

It is an object of this invention to provide a strain measuring device for measuring pitching, rolling and yawing moments and lift, drag, and side forces on a wind tunnel model with great precision.

It is a further object of this invention to provide a six-component strain measuring device contained entirely within the model on which the measured forces act.

It is a further object of this invention to provide a wind tunnel force and moment measuring device which measures yawing, pitching and rolling moments and drag forces separately and independently.

It is a further object of this invention to provide a wind tunnel force and moment measuring device which has negligible aerodynamic effect on the model.

It is a further object of this invention to provide a wind tunnel force and moment measuring device which is unaffected by aerodynamic effects of the supporting structure or deflections of said supporting structure.

Other objects of invention will become apparent from the following description taken in connection with the accompanying drawings in which Fig. 1 is an inboard profile of a missile model supported by the invention;

Fig. 2 is a detailed side view of the drag measuring device used in the invention of Fig. 1;

Fig. 3 is a section view of the yaw and pitch moment measuring device of this invention taken along the line 3—3 of Fig. 1;

Fig. 4 is a section view of the measuring arm of the drag measuring device, showing the positioning of the strain gauges, taken along the line 4—4 of Fig. 1;

Fig. 5 is a section view showing the positioning of the strain gauges in the roll moment measuring device taken along the line 5—5 of Fig. 1;

And Fig. 6 is a schematic drawing of a bridge circuit for indicating moments measured by the device of Fig. 1.

Referring now to Fig. 1, a model body 1 is rigidly supported on a collar 2 of the strain measuring device at the nose end of the model. Immediately astern the collar lies a hollow rectangular cross-section moment-measuring device 3, shown in detail Fig. 3, which is adapted to receive strain gauges 18 through 25 on its four sides. Immediately behind moment measuring surfaces 3 is drag measuring device 4 shown in detail in Fig. 2. Drag device 4 transmits forces either through thin plate flexures 5 and 6, or through knife edges 8 and 13 attached to tension rod 14 and cantilever beam 17. Knife edge 13 rests against support 16 which is rigidly attached to the upper plate of drag measuring device 4, and knife edge 8 rests against load arm 15 of cantilever beam 17. Cantilever beam 17 is rigidly attached to the lower plate of drag measuring device 4. The upper rigid plate of drag measuring device 4 is rigidly attached to missile model 1 through collar 2 and moment-measuring device 3. The lower rigid plate of drag measuring device 4 is rigidly attached to supporting sting 11 through moment-measuring devices 9 and 10. Flexures 5 and 6 are thin, flexible plates securely mounted between the upper and lower rigid plates of drag measuring device 4. Flexures 5 and 6 together with the rigid upper and lower plates of drag measuring device 4 form a structural parallelogram. A structural parallelogram is composed of four structural members connected together in a closed loop with opposite sides positioned parallel to each other. The structural parallelogram of device 4 readily transmits yaw, pitch, and roll torques between missile model 1 and sting support 11. However, flexures 5 and 6 act as end-loaded cantilever beams when model 1 is subjected to drag forces, and since the flexures are relatively thin plates they readily bend under the load. The drag force load is therefore transmitted through tension rod 14 and cantilever beam 17. Immediately behind drag measuring device 4 is another section 9 for measuring pitching and yawing moments which is also hollow rectangular in cross-section and adapted to receive strain gauges on its four surfaces. Behind this pitching and yawing moment measuring region and rigidly connected thereto is rolling moment measuring surface 10 which is a hollow cylinder of uniform cross-section adapted to receive strain gauges 30 through 33 preferably placed at an angle of 45° with the longitudinal axis of the cylinder in accordance with the well known Mohr circle stress analysis theory. Attached to the rear of rolling moment measuring surface 10 is supporting sting 11 which rigidly supports the entire strain measuring device and serves as a conduit for strain gauge lead-in wires 12 which allow the reading of the strain gauges at an external point. Note that supporting sting 11 does not touch model body 1 and that therefore supporting sting 11 supports the entire model in cantilever fashion.

In operation the device functions as follows: Assuming that a mixed yawing, rolling, and pitching moment and drag force are applied to the model body by aerodynamic loads, the entire measured load will be carried from the model body to the strain measuring device by means of collar 2. If the strain measuring device is arranged so that pitching and yawing moment measuring surfaces of devices 3 and 9 are orthogonal with respect to each other, with the pitching moment measuring surface horizontal in the tunnel and the yawning moment measuring surface vertical in the tunnel, the upper and lower surfaces of these two portions of the strain measuring device will be affected by the pitching moment applied to the model and will experience tension and compression in the extreme fibres of the cross-section in accordance with the flexure formula. The tension and compression will be accurately sensed by strain gauges 18 through 21 placed with their sensitive axes parallel to the axis of the strain measuring device and positioned as shown in Fig. 3 on both the upper and lower surfaces of this part of the strain measuring device. Longitudinal compression due to drag forces and shear stress caused by rolling moment on the model will be automatically calibrated out by the arrangement of the strain gauges.

Assuming a pitching moment causing the resistance of strain gauges 18 and 19 to increase while the resistance of strain gauges 20 and 21 decreases, and referring to Fig. 6, the change in the relative resistances of resistance strain gauges causes an unbalance of bridge 35 connected across source of D. C. potential 34. Voltmeter 36 indicates this unbalance condition. The reading of voltmeter 36 is a function of the magnitude of the pitching moment. The yawing moment may be measured in precisely the same way with the gauges on both the port and starboard sides.

The measurement of drag is accomplished by the measurement of bending moment in drag force measuring arm 7 which is parallel to the longitudinal axis of the model. Flexures 5 and 6 are devised to carry little drag but can carry torsion, tension and compression, and the bending moment enforced upon them by a side force. Therefore, only the drag force is carried by drag force measuring arm 7 which, it must be noted, has a constant bending moment throughout its length because its surfaces are arranged to be parallel with the longitudinal axis of the model and it is eccentrically loaded. A detailed section view of measuring arm 7 showing the position of strain gauges 26 through 29 is shown in Fig. 4. When the strain measuring device is subjected to a drag force, the upper surface of arm 7 is in compression while the lower surface of arm 7 is in tension. By connecting strain gauges 26 through 29 in a bridge network similar to that of Fig. 6, the magnitude of the drag force is found. An accurate measurement of drag force is therefore attained by the measurement of flexure of drag force measuring arm 7 and this measurement is uncontaminated by the influence of any other force or moment components present on the model.

To measure rolling moment, rolling moment measuring surface 10 is provided in the form of a hollow cylinder. This cylinder is only of such thickness as to insure the maintenance of elastic stability over the range of operating loads contemplated. If the strain gauges are placed at several points on the periphery of the cylinder so that they measure strain at an angle of 45° with the longitudinal axis of the cylinder, the result will be that they will sense the shear stress in the cylinder and hence will measure the rolling moment acting on the model. Compressive stress and stress resulting from bending moment in the cylinder are automatically calibrated out by the arrangement of the strain gauges. Rolling moment measurement, therefore, is uncontaminated by the components of force and moment present on the model and no correction need by applied to the observed strains to eliminate these effects.

Supporting sting 11 is rigidly attached to the entire strain measuring device at the rear of the model and its shape is chosen to correspond to the shape of the exhaust gas stream of the missile or rocket, a model of which is being tested. The sting, therefore, being the only external connection to the strain measuring device and to the model, no false loads are applied to either the device or the model by the supporting structure. All forces are measured internally and all the data may be quickly reduced because no corrections are necessary for aerodynamic effects of the supporting structure on the strain measuring device or for supporting structural deflections resulting in misalignment between the model and device or interaction of the various force and moment components.

Although the invention has been described and illustrated in detail, it is to be clearly understood that the same is by way of illustration and example only and is not to be taken by way of limitation, the spirit and scope of this invention being limited only by terms of the appended claims.

I claim:

1. In an apparatus for measuring aerodynamic forces, a sting, balance means supported on said sting, a hollow test body supported on said balance means, said balance means being housed wholly within said test body, and means externally of said body for indicating the forces acting on said balance.

2. An apparatus for measuring the aerodynamic forces exerted on a hollow test body in a fluid current comprising a sting, balance means mounted on said sting and housed wholly within said test body and supporting said test body, said balance means comprising strain responsive means for sensing the forces acting on said balance as a result of the aerodynamic forces acting on the test body, and indicating means connected to said strain responsive means.

3. Means for measuring without appreciable interaction the pitching, yawing, and rolling moments and drag force on a wind tunnel model comprising a continuous strain measuring device of substantially cylindrical shape having a centrally disposed section subjected to drag load only, at least one section of circular cross-section, at least one section of rectangular cross-section, strain gauges attached to said circular cross-sectioned sections at angles of 45 degrees with the longitudinal axis of said strain measuring device to measure only rolling moment acting on said model, strain gauges attached longitudinally in pairs to the four sides of said rectangular section to measure only pitching and yawing moments, and strain gauges attached symmetrically on said centrally disposed section to measure only drag forces on said model; means for rigidly attaching one end of said strain measuring device internally of said wind tunnel model at only one point; and means attached to the opposite end of said device for supporting said strain measuring device and said model in a wind tunnel to thereby separate the pitching, yawing, rolling, and drag components of the forces and moments on said model without interfering with air flow around said model.

4. A device as recited in claim 3 in which said centrally disposed section comprises a structural parallelogram having flexures on two opposite sides and positioned to yield under longitudinal compression of said measuring device and to transmit without yielding other moments and forces on said device, and a longitudinally disposed beam positioned to be loaded eccentrically by the yielding of said parallelogram, said strain gauges on said centrally disposed section being attached to said beam to provide a measure of drag force on said model.

5. Means for measuring drag forces on a wind tunnel model supported on a sting type supporting structure comprising a rigid plate rigidly attached to said model; a second rigid plate arranged parallel to and symmetrically with said first-named plate and rigidly attached to said supporting structure, said rigid plates being arranged parallel to the longitudinal axis of said model; a thin flexible plate arranged normal to the longitudinal axis of said model and attached between said first and said second rigid plates; a second thin flexible plate arranged parallel to said first thin plate and normal to the longitudinal axis of said model and attached between said first and said second rigid plates; a cantilever beam with upper and lower surfaces and having one end attached to one of said rigid plates; a tension rod positioned parallel to the longitudinal axis of said model and having one end attached to the other of said rigid plates and having the other end attached to the other end of said cantilever beam; electrical strain gauges mounted on the upper and lower surfaces of said cantilever beam; and indicator means connected to and responsive to the deformation of said strain gauges to thereby obtain an indication of the drag force upon said model.

References Cited in the file of this patent

UNITED STATES PATENTS

| | | |
|---|---|---|
| 2,252,464 | Kearns et al. | Aug. 12, 1941 |
| 2,359,125 | Langer et al. | Sept. 26, 1944 |
| 2,392,293 | Ruge | Jan. 1, 1946 |
| 2,420,148 | Ostergren | May 6, 1947 |
| 2,447,566 | Decker et al. | Aug. 24, 1948 |
| 2,448,528 | Heuver | Sept. 7, 1948 |
| 2,458,481 | Ruge | Jan. 4, 1949 |
| 2,475,614 | Hoppmann et al. | July 12, 1949 |
| 2,485,977 | Mains | Oct. 25, 1949 |
| 2,522,117 | Holt et al. | Sept. 12, 1950 |